Sept. 12, 1944.  L. TAYLOR  2,358,264
GAUGE OR INSTRUMENT FOR MEASURING OR TESTING MECHANICAL WORK
Filed Feb. 26, 1943  6 Sheets-Sheet 2
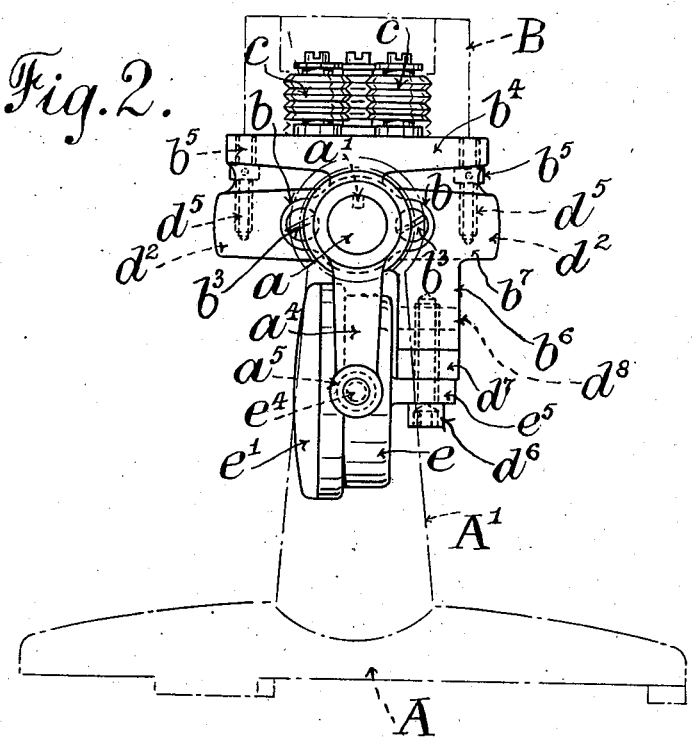
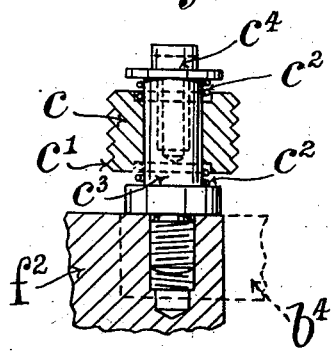
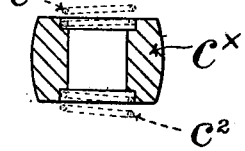
Inventor
LEONARD TAYLOR
By: Francis E. Boyce
ATTORNEY.

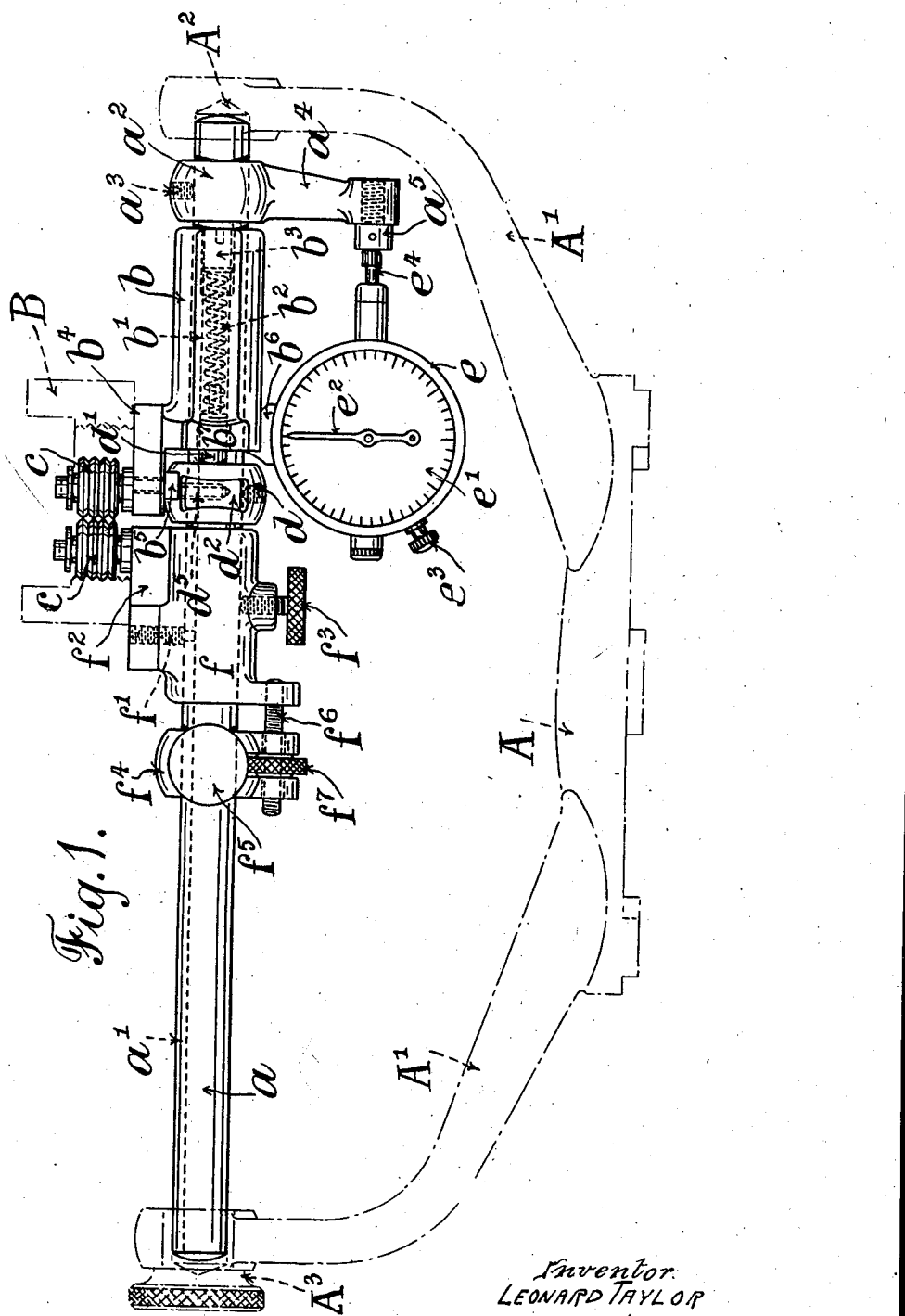

Sept. 12, 1944.  L. TAYLOR  2,358,264
GAUGE OR INSTRUMENT FOR MEASURING OR TESTING MECHANICAL WORK
Filed Feb. 26, 1943  6 Sheets-Sheet 3

Inventor
LEONARD TAYLOR
By: Francis E. Boyce
ATTORNEY

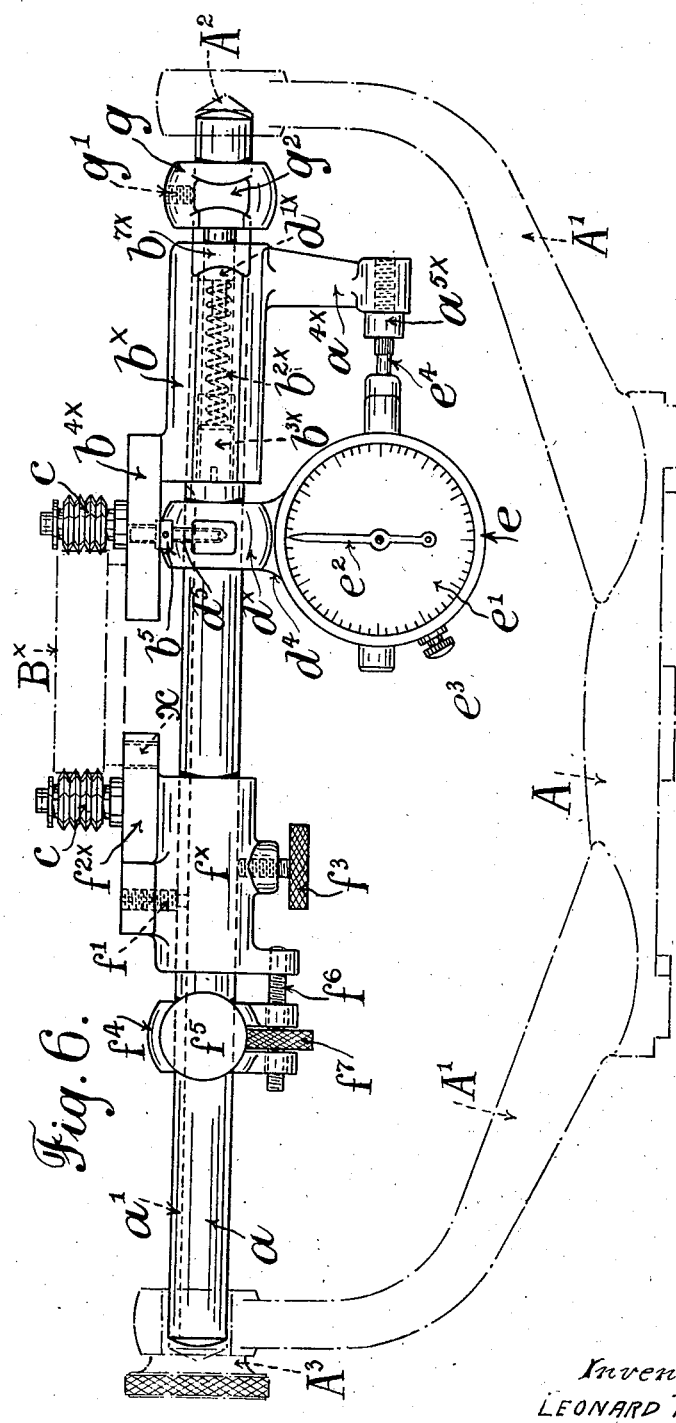

Patented Sept. 12, 1944

2,358,264

UNITED STATES PATENT OFFICE 2,358,264

GAUGE OR INSTRUMENT FOR MEASURING OR TESTING MECHANICAL WORK

Leonard Taylor, Castleton, Rochdale, England

Application February 26, 1943, Serial No. 477,196
In Great Britain April 3, 1942

5 Claims. (Cl. 33—199)

This invention relates to gauges or instruments for measuring or testing the accuracy of mechanical work.

The instrument may be used for measuring or testing bores or interiors, or screw-threads in such, or the distance between desired parallel or other faces. Also by very slight modification in construction the instrument can be used for measuring or testing the exterior faces of circular or other bodies, or of screw-threads thereon, the principle of working and the mechanical features being similar in the modified instrument.

Gauges or measuring instruments for the purposes stated are known, but, generally speaking, such are expensive and not well suited for general use by ordinary workmen in workshops.

This invention provides simple, robust and inexpensive measuring or testing instruments for the uses stated and there is hereafter described the general principle of working and structure of instruments for the purposes mentioned.

The following detailed description makes reference to the accompanying drawings, wherein:

Fig. 1 is a front elevation of the instrument for use in internal testing or measuring.

Fig. 2 shows an end view of Fig. 1 looking from the right.

Fig. 4 shows by a detached view one of the anti-friction rollers having annular thread-like projections and the manner of mounting.

Fig. 5 shows an anti-friction roller with plain periphery.

Fig. 6 is a front elevation of the slightly modified instrument for use in external testing or measuring.

Figure 3:
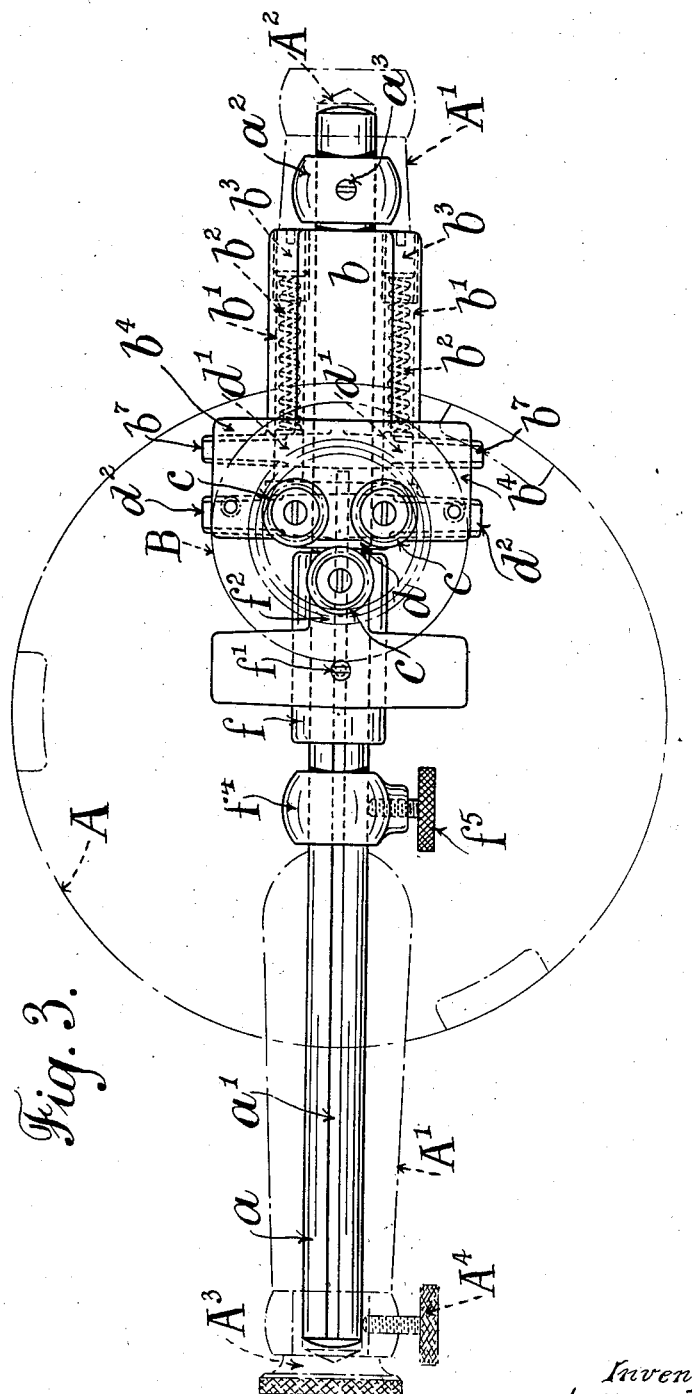
Fig. 3 is a plan view of Fig. 1.

The instrument for the purposes first-mentioned is now described, and, in this, there is provided a turned spindle of some length marked $a$. This spindle $a$ has a longitudinal key-way $a^1$ running for a considerable part of its length, and a collar $a^2$ is fixed at one end by a grub screw $a^3$, the collar $a^2$ having a radially projecting arm $a^4$ with adjustable threaded stud $a^5$, to be referred to later. A slidable headstock $b$ is mounted on the spindle $a$ and guided in suitable manner as hereafter mentioned. This slidable headstock $b$ is bored longitudinally at two places $b^1$, $b^1$ to house two coiled springs $b^2$, $b^2$, the outer ends of the bores being closed by plugs $b^3$. On the platform $b^4$ of said slidable headstock $b$ are mounted anti-friction devices, shown herein as comprising two anti-friction rollers $c$, $c$ which are advantageously floating rollers. One of such floating rollers (of which three are necessary as will be seen later) is shown to an enlarged scale by Fig. 4. Such anti-friction rollers are fashioned with annular thread-like projections and are free to move axially end-on against the action of delicate springs $c^2$, $c^2$, and the axles $c^3$ for said anti-friction rollers $c$, $c$ can be detachably secured to the platform $b^4$ in manner such as illustrated. Threaded studs $c^4$ permit of ready removal of the anti-friction rollers. In case the thread-like projections $c^1$ are not desired, the rollers may be plain surfaced or have a barrel shaped periphery as shown in Fig. 5 and marked $c^x$.

Respecting the springs $b^2$ housed in the slidable headstock $b$, these are adapted to co-operate with two turned plungers $d^1$, $d^1$, projecting into the bores in the slidable headstock $b$. These plungers $d^1$, $d^1$ are carried by a central stop member or bracket $d$ which has two wings or arms $d^2$, $d^2$ (providing thumb and finger grips) and is fixed on the turned spindle $a$. The platform $b^4$ of the slidable headstock $b$ has flat headed studs $b^5$, screwed therein, the heads of which rest and are slidable upon adjustable grub screws $d^6$ screwed into the two wings or arms $d^2$, $d^2$, said devices serving to guide and ensure the slidable headstock moving in a straight translation. Upon a bracket arm $b^6$ of the slidable headstock $b$ is mounted an appropriate type of standard or known graduated gauge or amplifier, such as the gauge marked $e$ having rotatable or settable dial $e^1$ and rotatable pointer $e^2$ and dial fixing screw $e^3$, said gauge hereinafter referred to, as a standard dial gauge, and such as will give readings plus or minus in thousandths of an inch or otherwise.

This standard dial gauge has a push spindle $e^4$ pressed outwards by a spring all as known, and the push spindle $e^4$ is acted upon when pressed against the adjustable threaded stud $a^5$.

Opposed to the slidable headstock $b$ and slidable upon the turned spindle $a$ the slot $A^1$ of which is engaged by the reduced end of the grub screw $f^1$, is a second headstock, the main bracket $f$ of which carries on its platform $f^2$ the third anti-friction roller $c$ of the character before mentioned, and this main bracket $f$ has a locking screw $f^3$. The other component of the headstock $f$ is a sliding sleeve $f^4$ which has a locking screw $f^5$, and this sliding sleeve $f^4$ is also mounted on the turned spindle $a$. It is interconnected with the main bracket $f$ by a screw-threaded spindle $f^6$ which has a milled adjusting nut $f^7$.

The three anti-friction rollers are fashioned, if required, with annular thread engaging projections $c^1$ (Fig. 4); or with plain peripheries as shown at $c^x$ (Fig. 5).

The three anti-friction rollers are obviously intended to engage the bore or what is to be measured or tested at three points and radially with regard to their disposition.

The instrument can be removably mounted in the two arms $A^1$ of a stand A with base. One end of the spindle $a$ is shown fitting a bearing $A^2$ in one arm of the stand A, the other end engaging a removable bush $A^3$ in the other arm of the stand and being locked by a threaded stud $A^4$. The instrument can, if desired, be readily introduced into and withdrawn from the stand as is obvious.

In using the instrument, mounted on the stand for example, to set same to and to gauge from a master template or reference ring as B, and with the push spindle $e^4$ of the standard dial gauge $e$ bearing on the adjustable threaded stud $a^5$, the locking screws of the two elements $f$, $f^4$ are unscrewed, and the sliding sleeve element $f^4$ is separated from the main bracket $f$ by a slight distance. The main bracket $f$ is moved such a distance as roughly suits the fit of the anti-friction rollers such as $c$, to the internal diameter of the template B or master reference ring or gauge the workman is dealing with. This means, the three anti-friction rollers $c$ are roughly set to the bore of template B. The next step, is to fix the locking screw $f^5$ of the sliding sleeve element $f^4$ of the second head-stock. This done, the nut $f^7$ on the adjusting screw $f^6$ is turned, which acts to draw to the left the main bracket $f$ of said second head-stock and to slightly advance the turned spindle $a$ to transfer the spring pressure onto said spindle and onto two of the anti-friction rollers $c$. The locking screw $f^3$ on the main bracket $f$ is then clamped on the turned spindle $a$ and the instrument as a result of all this is disposed in properly adjusted position with respect to the template B. The slight movement of the turned spindle $a$ will have affected through the push spindle $e^4$ the position of the pointer $e^2$ with respect to the graduations on the dial $e^1$ of the standard dial gauge $e$. The dial clamping screw $e^3$ is released and the dial $e^1$ turned so that same can be set to bring the zero mark on the dial to the position assumed by the pointer. The dial clamping screw $e^3$ is actuated to fix the dial thus set.

By pressing the spring-loaded slidable headstock $b$ towards the fixed central bracket $d$, placing the thumb on a wing or arm $d^2$ of the fixed bracket $d$ and pressing with the fingers on a wing or arm $b^7$ on the slidable headstock $b$, the springs $b^2$ in the slidable headstock $b$ are further compressed. By such act, the template B can be removed, and the piece of work to be measured or tested can be dealt with and introduced into position by again pressing the slidable headstock $b$ towards the central bracket $d$. On release of finger and thumb pressure upon the wings or arms $b^7$, $d^2$, the anti-friction rollers $c$ will fit in proper position in the work to be measured or tested, and the push spindle $e^4$ encountering the threaded stud $a^5$ will be influenced according to accuracy or inaccuracy of the piece of work being measured or tested.

If the tested work is accurate the pointer of standard dial gauge will turn to zero, or if inaccurate will indicate the amount of inaccuracy, plus or minus, in degrees in thousandths or otherwise according to the character of the graduations on the standard dial gauge.

If there are screw-threads on the anti-friction rollers $c$, then by the manner of mounting and the aid of the aforementioned springs $c^2$, $c^2$, the screw-threads on the work will be engaged and accuracy or inaccuracy measured.

The instrument automatically centres itself when expanded in the bore or the like of the template or master gauge or of the work, and said instrument is operative with a vertical or horizontal disposition, as later mentioned.

It will be understood that the instrument can be taken out of and used without the stand should its use in such manner be better suited to circumstances.

Figure 7:
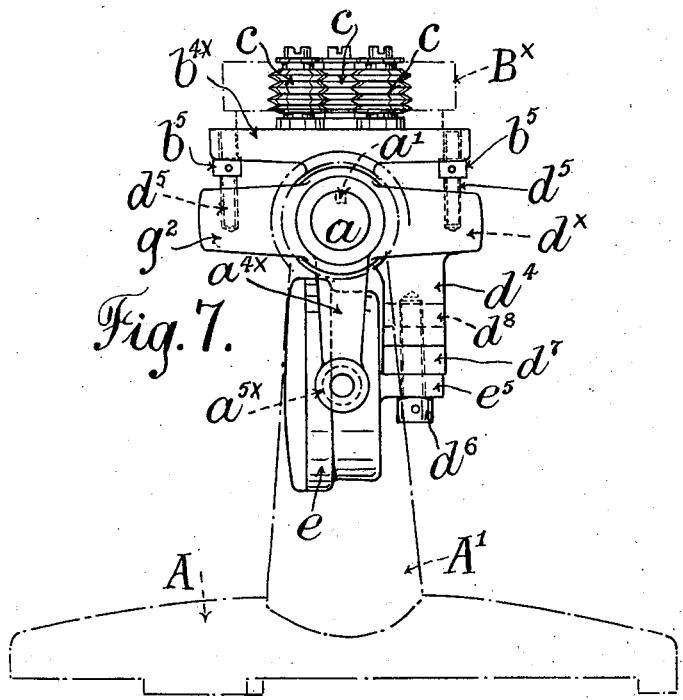
Fig. 7 shows an end view of Fig. 6 looking from the right.
Figure 8:
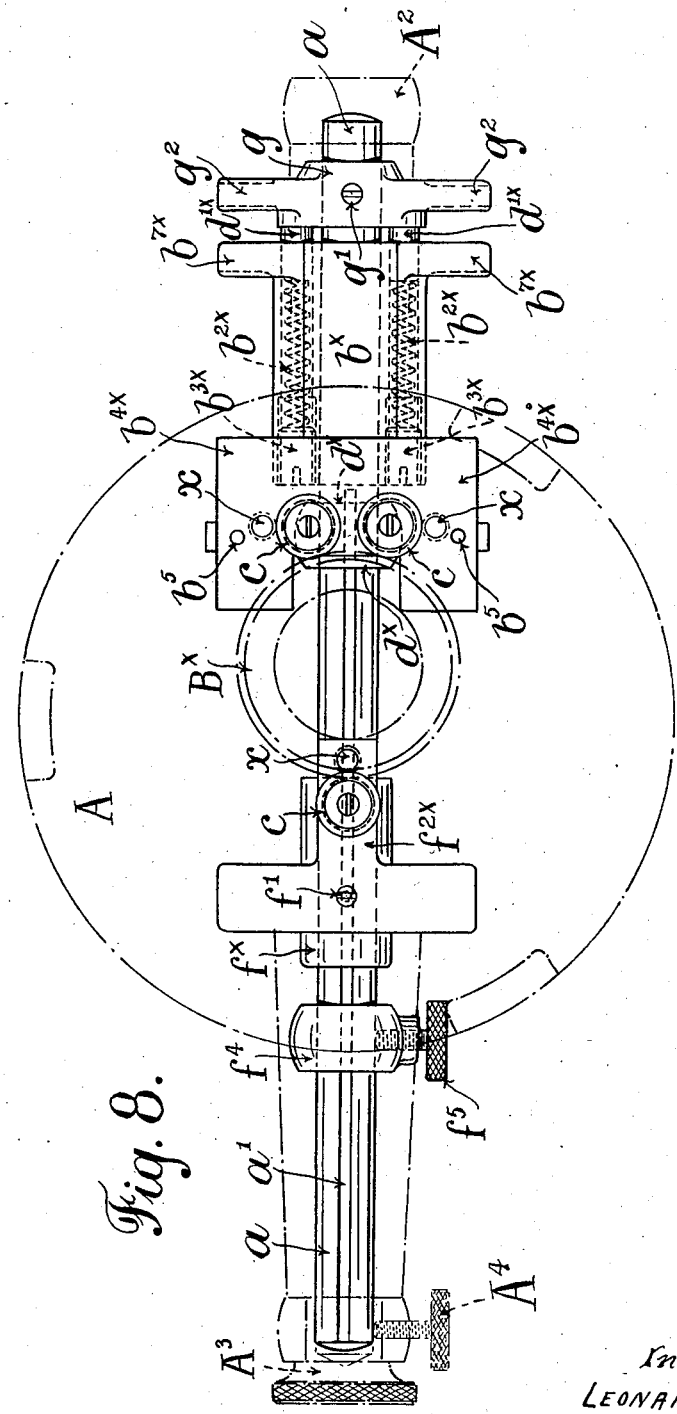
Fig. 8 is a plan view of Fig. 6.

In the instrument for testing or gauging work externally, the arrangements are slightly modified, and the modified arrangement is illustrated by the Figs. 6 to 8.

There is a turned spindle $a$ with keyway $a^1$ and a slidable headstock $b^x$ mounted thereon. This slidable headstock $b^x$ carries the arm $a^{4x}$ with adjustable threaded stud $a^{5x}$ and projecting wings or arms $b^{7x}$. The turned spindle $a$ also carries a spaced collar $g$ fixed thereon as by a grub screw $g^1$, said collar $g$ having projecting wings or arms $g^2$. Springs $b^{2x}$ are housed in bores in the slidable headstock $b^x$, the bores closed at the inner ends of threaded plugs $b^{3x}$, said springs acting on plungers $d^{1x}$ projecting from the inner face of the spaced collar $g$. When the wing or arm $b^{7x}$ is pressed by holding same and a wing or arm $g^2$ between thumb and finger, the slidable headstock $b^x$ moves end-on and the springs $b^{2x}$ are compressed. On the platform $b^{4x}$ two of the anti-friction rollers $c$ are shown as mounted, same having the annular thread-like projections and being capable of floating; or the anti-friction rollers may have a plain periphery as already mentioned.

The standard dial gauge $e$ is shown mounted on the central bracket $d^x$ fixed on the turned spindle $a$, and the end of its push spindle $e^4$ bears on the adjustable threaded stud $a^{5x}$. To guide and support the platform $b^{4x}$ and the slidable headstock $b^x$, threaded studs $b^5$ and grub-screws $d^5$ are shown, see particularly Figs. 6 and 7, and act in manner already described.

There is also provided a second or auxiliary headstock mounted on the turned spindle $a$ and consisting of a main bracket $f^x$ (with slot engaging grub screw $f^1$) and sliding sleeve $f^4$ similar to those already mentioned.

On the platform $f^{2x}$ of the main bracket $f^x$ the third anti-friction roller $c$ is mounted in manner already described. If it is desired to vary the disposition of the pivotal supports for the anti-friction rollers on their platforms, different holes can be provided in the platforms to vary the relative spacing of said anti-friction rollers as is indicated by the reference letter $x$.

In using the instrument, as for example in position in the stand, the master template or gauge $B^x$ is placed upon the platforms $b^{4x}$, $f^{2x}$. This done, the loose headstock including main bracket $f^x$ and sliding sleeve $f^4$ are moved to approximately set the anti-friction roller $c$, or $c^x$ as the case may be, to the exterior of the master template or gauge $B^x$. The sliding sleeve $f^4$ is clamped by stud $f^5$ and the milled nut $f^7$ operated to push inwards the main bracket $f^x$ and adjust the anti-friction rollers to exact setting. The main bracket $f^x$ is then clamped by the screw $f^3$. As a consequence of all this, a slight pressure is put upon the springs $b^{2x}$ and the spindle $e^4$ of the standard dial gauge $e$ is acted upon by the threaded stud $a^{5x}$ and the pointer $e^2$ influenced to some extent. This done, the locking screw $e^3$ for the dial is unscrewed and the dial $e^1$ turned to set to zero with respect to the pointer $e^2$.

By pressing the wings or arms $b^{7x}$ towards the wings or arms $g^2$ between the thumb and fingers, such act further compresses or loads the springs $b^{2x}$, so that the anti-friction rollers are separated, allowing the master template or gauge $B^x$ to be removed. Thereafter, the work to be tested or measured can be applied to the platforms $b^{4x}$, $f^{2x}$ whilst the anti-friction rollers are separated. When the anti-friction rollers are released they will bear upon the work, and the reading can be taken from the graduations on the standard dial gauge $e$ which will indicate the accuracy or the degree of inaccuracy, plus or minus.

The instrument just described may, as already mentioned, be used supported by a stand as shown by the Figs. 6, 7 and 8, or same may be taken from the stand and used in connection with templates or gauges and the work, and detachment is effected in manner already described with reference to Figs. 1, 2 and 3.

In using the aforesaid instrument, it is generally most convenient to dispose the dial of the standard dial gauge in a vertical plane, but in other cases, the disposition in a horizontal plane may be advantageous. This can be arranged.

Figure 9:
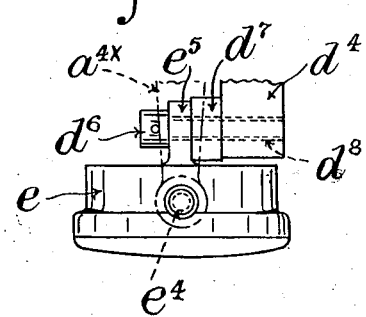
Fig. 9 is a detail view indicating that the standard dial gauge used with the instruments may, if desired, be disposed in a position at right-angles to that shown in Fig. 6.

In Figs. 1, 2, 6 and 7, the standard dial gauge is shown vertically disposed and as attached to a pendent support in Figs. 6 and 7 by a pendent support $d^4$ from the central bracket $d^x$. Certain of the figures, for example Figs. 7 and 9, indicate mounting arrangements which permit the standard dial gauge to be turned through 90°. In Fig. 7 the shank $e^5$ of said standard dial gauge is fixed by a threaded stud $d^6$ to the pendent support $d^4$, using an intervening loose block $d^7$, the threaded stud $d^6$ being vertically disposed. Attachment in this way gives a vertical disposition of the standard dial gauge (see Figs. 6 and 7). If a horizontal disposition is desired, as for example when using the detached instrument in an inverted position, then the threaded stud $d^6$ is removed, detaching the aforesaid gauge and the loose block $d^7$. The loose block $d^7$ is then disposed on the inner face of the pendent support $d^4$, and the aforesaid gauge is turned through 90° and its shank $e^5$ abutted on the aforesaid differently disposed block $d^7$ and the threaded stud $d^6$ screwed into a threaded transverse bore $d^8$ in the pendent support $d^4$, the result being the horizontal disposition indicated at Fig. 9. It will be seen, that this disposition of the push spindle $e^4$ still coincides with the centre line of the adjustable threaded stud $a^{5x}$, against which the push spindle operates, and a broken part of the pendent bracket $a^{4x}$ is indicated in broken lines in Fig. 9. Similar mounting arrangements to change the disposition of the standard dial gauge can be provided with respect to the instrument shown at Figs. 1 to 3, the means just described for such purpose being indicated by Fig. 2, and it is unnecessary to repeat the description.

The mechanism and structure of the described instruments is robust and they are therefore well suited for use by semi-skilled labour.

I declare that what I claim is:

1. An instrument for measuring mechanical work, comprising a spindle, a headstock mounted for sliding movement on said spindle, a stop member secured on the spindle in spaced relation to said headstock, cooperating means carried by stop member and headstock for guiding the latter in its sliding movement on the spindle, a pair of rollers mounted on said headstock, a second headstock slidably mounted on the spindle and having means for securing it at any desired point on said spindle, a third roller carried by said second headstock in position to cooperate with said pair of rollers for engaging the work to be measured, a measuring gauge supported on an arm depending from one of the members mounted on the spindle, and means carried on the spindle and cooperating with means carried by said gauge to transmit movement of the slidable headstock to said gauge, said slidable headstock and stop member having portions manually engageable for moving the sliding headstock with relation to the second headstock thereby to permit engagement and disengagement of the rollers from the work to be measured.

2. An instrument as set forth in claim 1, the slidable headstock having a pair of longitudinally extending openings therein, cushioning springs disposed in said openings, and plungers carried by said stop member and extending into said openings thereby to compress said springs when the slidable headstock is moved toward the stop member.

3. An instrument as set forth in claim 1, the cooperating means for transmitting movement of the slidable headstock to the gauge comprising an arm extending radially from the spindle and a spring cushioned push rod extending from said gauge in position to abut against said arm thereby to operate the gauge in response to the sliding movement of the headstock.

4. An instrument as set forth in claim 1, including a member secured on said spindle and having means in engagement with said second headstock for adjusting the same to the desired position on the spindle.

5. An instrument for measuring mechanical work, comprising a supporting stand, a spindle removably secured at its opposite ends in said stand, a headstock mounted for sliding movement on said spindle, a stop member secured on the spindle in spaced relation to said headstock cooperating means carried by said stop member and headstock for guiding the latter in its sliding movement, said slidable headstock having a pair of longitudinally extending openings therein, cushioning springs disposed in said openings, plungers carried by said stop member and extending into said openings thereby to compress said springs when the slidable headstock is moved toward the stop member, a second headstock slidably mounted on the spindle and having means for securing it at any desired point on said spindle, cooperating means carried by said headstocks for engaging the work to be measured, an arm depending from said stop member, a measuring gauge supported on said arm and having a spring cushioned push rod extending therefrom, an arm depending from said first headstock into position to engage said push rod thereby to operate the same and transmit movement of the headstock to said gauge, a member secured on said spindle and having means in engagement with the second headstock for adjusting the latter longitudinally of the spindle, and manually engageable means carried by the stop member and first headstock for moving the latter with relation to the second headstock thereby to permit engagement and disengagement of said work-engaging means.

LEONARD TAYLOR.